US009614917B1

(12) United States Patent
Hamilton et al.

(10) Patent No.: US 9,614,917 B1
(45) Date of Patent: Apr. 4, 2017

(54) SYSTEM AND METHOD OF PROVIDING SECURE DATA TRANSFER

(71) Applicant: Signiant Inc., Lexington, MA (US)

(72) Inventors: Ian Kennedy Hamilton, Ottawa (CA); Anthony Vasile, Ottawa (CA)

(73) Assignee: Signiant Inc., Lexington, MA (US)

( * ) Notice: Subject to any disclaimer, the term of this patent is extended or adjusted under 35 U.S.C. 154(b) by 0 days.

(21) Appl. No.: 15/332,215

(22) Filed: Oct. 24, 2016

(51) Int. Cl.
*H04L 9/00* (2006.01)
*H04L 29/06* (2006.01)
*H04L 29/08* (2006.01)
*H04L 29/12* (2006.01)
*H04L 12/26* (2006.01)

(52) U.S. Cl.
CPC ............ *H04L 67/141* (2013.01); *H04L 43/08* (2013.01); *H04L 61/1511* (2013.01); *H04L 61/2592* (2013.01); *H04L 63/0428* (2013.01); *H04L 63/166* (2013.01); *H04L 67/10* (2013.01); *H04L 67/42* (2013.01); *H04L 69/326* (2013.01)

(58) Field of Classification Search
CPC ..................... H04L 61/2592; H04L 61/1511
USPC ........ 709/219, 226, 227, 231, 239; 370/230, 370/235, 401
See application file for complete search history.

(56) References Cited

U.S. PATENT DOCUMENTS

| | | | |
|---|---|---|---|
| 6,412,009 B1 | 6/2002 | Erickson | |
| 7,117,267 B2 | 10/2006 | Bavadekar | |
| 7,237,260 B2 | 6/2007 | Yu | |
| 8,340,103 B2 | 12/2012 | Tan | |
| 9,137,334 B2 | 9/2015 | Zhou | |
| 9,148,404 B2 | 9/2015 | Chuang | |
| 9,231,851 B2 * | 1/2016 | Chen | H04L 45/04 |
| 2005/0108411 A1 | 5/2005 | Kliland | |
| 2006/0010243 A1 | 1/2006 | Duree | |
| 2006/0056297 A1 | 3/2006 | Bryson | |
| 2010/0103872 A1 | 4/2010 | Park | |
| 2012/0198079 A1 | 8/2012 | Spink | |
| 2012/0331528 A1 | 12/2012 | Fu | |
| 2013/0279899 A1 * | 10/2013 | Doverspike | H04B 10/03 398/2 |

FOREIGN PATENT DOCUMENTS

WO 2008102177 A2 8/2008

OTHER PUBLICATIONS

"On Egress Router Selection for Inter-domain Traffic with Bandwidth Guarantees"—Ho et al, University of Surrey, Sep. 2004 https://www.ee.ucl.ac.uk/~gpavlou/Publications/Conference-papers/Ho-04a.pdf.*

* cited by examiner

*Primary Examiner* — Randy Scott
(74) *Attorney, Agent, or Firm* — Sheppard Mullin Richter & Hampton LLP

(57) ABSTRACT

A system and method is provided for providing secure accelerated data transfer. The system may transparently provide accelerated data transfer between a client and a remote system. The system may provide a method for determining a mapped domain name for identifying an ingress server. The system may provide a method for determining a tunnel route to an egress server selected for establishing a connection with the remote system. The system may provide a method of exchanging data between the client system and the remote system via the ingress server and the egress server.

18 Claims, 3 Drawing Sheets

SYSTEM AND METHOD OF PROVIDING SECURE DATA TRANSFER

FIELD OF THE INVENTION

The invention relates to a system and method of providing secure data transfer.

BACKGROUND OF THE INVENTION

Users of client systems may frequently wish to connect with remote systems to enable fast, secure transfer of large data streams. Standard internet protocols may not be optimized for the needs of a particular user, and thus such transfers may be difficult to enable using only standard internet protocols. Some conventional solutions to providing accelerated data transfer require proprietary protocols which may not be compatible with all systems.

These and other drawbacks exist with conventional data transfer techniques.

SUMMARY OF THE INVENTION

The invention addressing these and other drawbacks relates to a system and method of providing data transfer between a local client system and a remote system. In particular, systems and methods described herein facilitate ingress to and egress from servers able to establish a data transfer tunnel between one another. Such servers may establish data transfer tunnels for various purposes and via various protocols. The efficiency and/or usefulness of a data transfer tunnel may be increased by reducing the portion of a network pathway outside of the tunnel. Systems and methods described herein may facilitate ingress to and egress from a data transfer tunnel, and thus increase the effectiveness of the data transfer tunnel across the entire route. Systems described herein may include a cloud based computer system comprising one or more ingress and egress systems, a tunnel routing service, and a mapping service. The ingress and egress systems may operate to establish a data connection between the local client system and the remote system. Data connections between ingress and egress systems may include multiple parallel data connections. The mapping service may operate to provide to local client systems mapped domain names identifying ingress servers. The tunnel routing service may operate to determine an egress system for completing the data transfer connection to the remote system.

In some implementations, a cloud-based computer system implemented method of establishing a secure data transfer connection between a client system and a remote system is provided. The cloud-based computer system may include a mapping service, an ingress system, a tunnel routing service, and an egress system. The method may include receiving, by the mapping service, a request to provide a mapped domain name, the request including a destination domain name corresponding to the remote system. The method may further include providing, by the mapping service, the mapped domain name in response to the request, receiving, by the ingress system, a request to establish a data transfer connection with the client system, establishing, by the ingress system, a first data transfer connection with the client system, supplying, by the ingress system, the mapped domain name to the tunnel routing system and requesting information about an address of the egress system corresponding to the mapped domain name, receiving, by the ingress system, information about an address of the egress system corresponding to the mapped domain name, establishing, by the ingress system, a second data transfer connection with the egress system based on the address of the egress system received from the tunnel routing service, establishing, by the egress system, a third data transfer connection with the remote system, and facilitating data exchange between the client system and the remote system via the first data transfer connection, the second data transfer connection, and the third data transfer connection.

In another implementation, a system for establishing a secure data transfer connection between a client system and a remote system is provided. The system may include a cloud-based computer system comprising one or more physical processors programmed by computer program instructions. The one or more physical processors may cooperate to implement a mapping service configured to receive requests to provide a mapped domain name, the request including a destination domain name corresponding to a remote system and provide the mapped domain name in response to the request, an ingress system, configured to receive a request to establish a data transfer connection with the client system and establish a first data transfer connection with the client system, an egress system; and a tunnel routing service configured to receive a request for information from the ingress system about an address of the egress system corresponding to the mapped domain name, and transmit information about the address of the egress system corresponding to the mapped domain name to the ingress system. The ingress system may be further configured to establish a second data transfer connection with the egress system based on the address of the egress system received from the tunnel routing service. The egress system may be further configured to establish a third data transfer connection with the remote system. The ingress system and the egress system may be configured to facilitate data exchange between the client system and the remote system via the first data transfer connection, the second data transfer connection, and the third data transfer connection.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
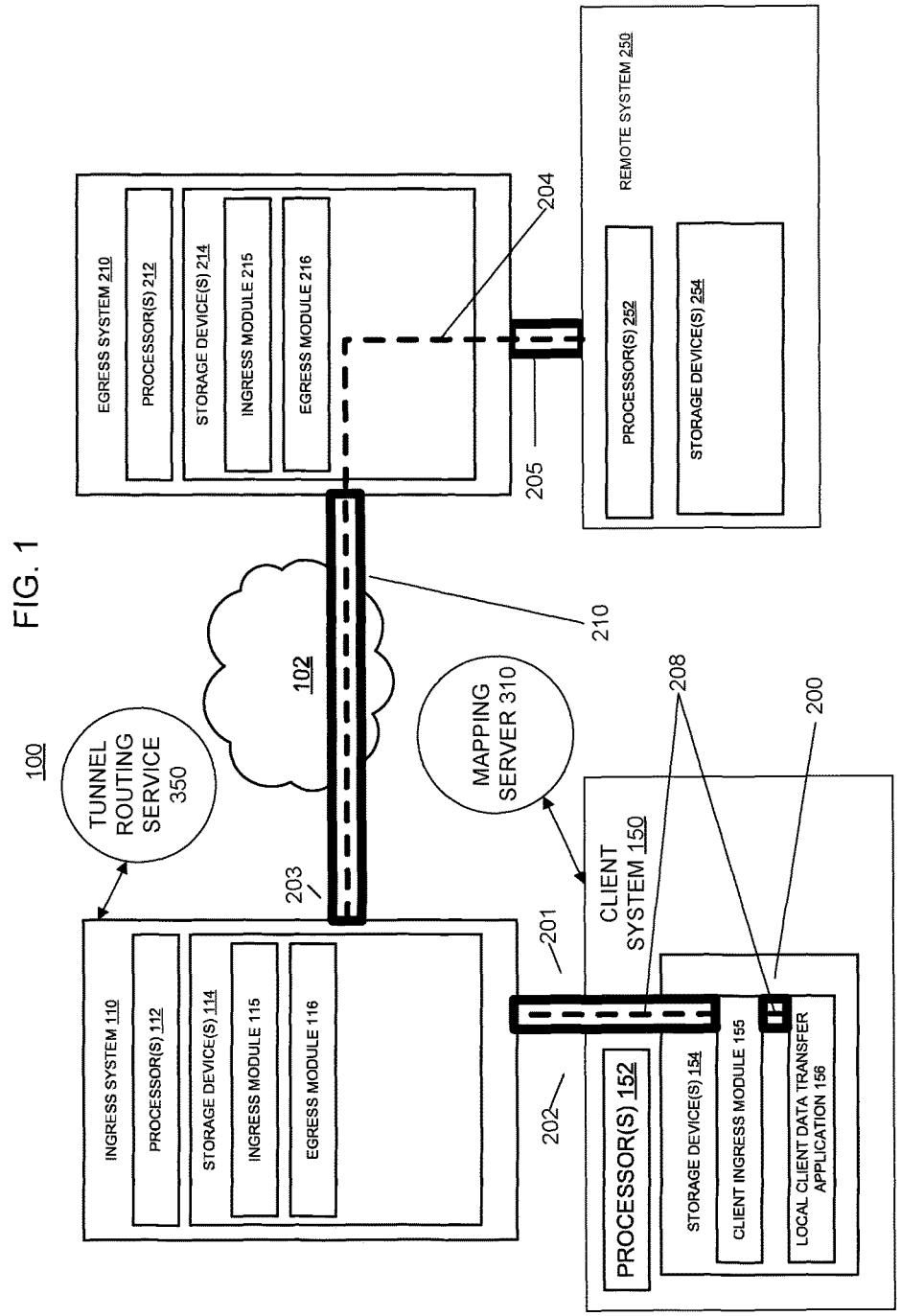
FIG. 1 illustrates a system for providing data transfer, according to an implementation of the invention.

The invention described herein relates to a system and method of providing data transfer between a local system and a remote system. Systems and methods described herein facilitate the use of a proprietary data transfer protocol by providing ingress and egress to data tunnels established by the proprietary data transfer protocol. Systems described herein may operate in a computing cloud based architecture having one or more computing platforms.

As used herein, "data transfer connection" refers to an established connection between two computer systems. That is, two computer systems between which a data transfer connection is established or opened must acknowledge each other and be prepared to exchange data with the other system while the connection is open. Merely sending unacknowledged data from one system to another system does not constitute a data transfer connection.

Proprietary data transfer protocols may be used to establish data transfer tunnels to transfer data across networks, including the internet, to increase speed, increase data integrity, increase data security, and for other reasons. As used herein, the term "data tunnel" refers to a data transfer connection established across network devices using a supported protocol to wrap an unsupported protocol. That is, a data portion of a supported network protocol may be used to carry a packet of the unsupported protocol. When establishing a connection between a local system and a remote system that may not have the capability of implementing the proprietary data transfer protocol, it may be necessary to establish tunnel ingress and tunnel egress locations for the local system and remote system to connect to the data transfer tunnel via standard protocols. Those portions of the network pathway operating under standard protocols may not receive the benefits for which the data transfer tunnel was established. Thus, the efficacy of data transfer when using a data transfer tunnel may be improved if a larger portion of the network pathway of the data being transferred occurs within the tunnel.

For example, if a data transfer tunnel provides accelerated data transfer compared to standard internet protocols, overall data transfer speed may be increased by reducing the network length that data must travel using standard internet protocols. The network length may refer to a time required for data travel over a network path. Thus, a shorter network length may provide increased data throughput, decreased latency times, and/or increased data transfer rates. Because the proprietary data transfer protocols only operate over a data transfer tunnel, the benefits of the proprietary protocols may be lost on the portions of the network path that must be traveled via standard internet protocols. Thus, reducing the length of the network path that must be traveled via standard internet protocols may increase the overall speed of data transfer.

The system may include one or more ingress and egress systems, one or more mapping services, and one or more tunnel routing servers. Ingress systems and egress systems may act as the end points for a data transfer tunnel established by the system. Local client systems may identify an ingress system by obtaining a mapped domain name from a mapping service. The mapped domain name may be resolved to identify an ingress server appropriate for use by the local client system. After a connection is established between the ingress server and the local client system, the ingress server may contact a tunnel routing server to determine an egress system for the destination domain name. The ingress server may contact the determined egress server and establish a secure connection. The egress server may then contact the remote system associated with the destination domain name and establish a connection. The local client system and remote system may then exchange data across the data transfer tunnel established by the ingress and egress servers.

In some implementations, systems and methods described herein may increase the efficiency of a proprietary transfer protocol (PTP). A proprietary transfer protocol may be any protocol that differs from the standard suite of internet protocols and is suitable for establishing a data transfer connection between local and client systems. Proprietary transfer protocols may be used for data transfer for various reasons, including increased speed, increased security, increased data integrity, etc. In some cases, it may not be possible to use a PTP over an entire network path of data transfer. For example, either or both of a local client system and a remote destination system may not be equipped to use the PTP in question. Because either or both ends of the connection may not be able to use the desired PTP, it may be beneficial to increase the benefits that the PTP provides by increasing the portion of the network pathway over which the PTP is used. Thus, it may be beneficial to provide an efficient route to access a PTP compliant network pathway from a client, as well as an efficient route to access a remote destination system from the PTP pathway.

In some implementations, an exemplary PTP capable of providing a data connection for increasing data transfer speeds over high latency and/or high loss networks may be used. In some implementations, a PTP between an ingress server and an egress server may employ a user datagram protocol (UDP) to establish a data tunnel between an ingress server and an egress server. Data portions of the UDP protocol data units (PDUs) may carry PTP PDUs, which, in turn, have data portions carrying user data. UDP is a connectionless protocol and thus does not guarantee delivery of PDUs, ordering of PDUs, or PDU duplicate protection. PTP PDUs, carried by UDP, may include header information that addresses these drawbacks of the UDP protocol. Other PTPs may be used without departing from the scope of the invention.

In another implementation, a PTP used with the present invention may include an accelerated network protocol as described in U.S. patent application Ser. No. 14/290,128, entitled "System And Method For Load Balancing Cloud-Based Accelerated Transfer Servers," filed on May 29, 2014, the disclosure of which is incorporated by reference in its entirety herein.

Exemplary System Architecture

FIG. 1 illustrates a system 100 for providing secure access to a remote system 250. In one implementation, system 100 may include one or more ingress systems 110, one or more egress systems 210, one or more client systems 150, one or more remote systems 250, one or more mapping services 310, one or more tunnel routing services 350, and/or other components.

Client System 150

Client system 150 may be a local client computing device performing operations for a user. Client system 150 may perform data transfer operations with remote systems 250.

Client system 150 may be configured as a server device, a gaming console, a handheld gaming device, a personal computer (e.g., a desktop computer, a laptop computer, etc.), a smartphone, a tablet computing device, and/or other device that can be programmed to establish a data connection between a local system and a destination server.

Client system 150 may include one or more processors 152 (also interchangeably referred to herein as processors 152, processor(s) 152, or processor 152 for convenience), one or more storage devices 154, and/or other components.

Processors 152 may be programmed by one or more computer program instructions. For example, processors 152 may be programmed by client ingress module 155, local client data transfer application 156 and/or other instructions that program ingress system 110 to perform various operations, each of which are described in greater detail herein. As used herein, for convenience, the various instructions will be described as performing an operation, when, in fact, the various instructions program the processors 152 (and therefore Client system 150) to perform the operation.

Client system 150 may include a client ingress module 155. Client ingress module 155 may be a software module residing on client system 150 to facilitate access between local client data transfer applications 156, such as web browsers, with components of the file transfer system, including ingress systems 110 and mapping service 310.

Client ingress module 155 may establish a data connection with local client data transfer applications 156 and local agents. Client ingress module 155 may establish the connection with the local client data transfer application 156 via a transmission control protocol (TCP).

Local client data transfer applications 156 may be software modules operating, executing, and/or residing on client system 150. Local client data transfer applications may include, for example, web browsers, ftp applications, and other data transfer software. Local client data transfer applications 156 may include, without limitation, applications configured for data transfer applications using standard protocols, including TCP, HTTP, etc.

Local agents may be system agents operating on client system 150 and configured to perform data transfer operations. Local agents may include system agents configured for data transfer using standard protocols, including TCP, HTTP, etc. In some implementations, client ingress module 155 may be configured to establish an intraclient data connection 200 with a local client data transfer application 156. Intraclient data connection 200 may include, for example, a TCP connection. In some implementations, a local client data transfer application 156 may include software executing a client device connected to client system 150 via LAN, WiFi, Bluetooth, and/or any other local data protocol.

Client ingress module 155 may connect to ingress system 110 via any standard protocol, including, without limitation, TCP, HTTP, UDP, etc., and any suitable proprietary transfer protocol (PTP), including, for example, tunnel transfer protocols and others. Client ingress module 155 may establish a client ingress data connection 201 with ingress system 110. Client ingress data connection 201 may include, for example, a PTP connection and/or a standard protocol, e.g., TCP, HTTP, UDP, etc. In some implementations, a PTP connection between client ingress module 155 and ingress system 110 may include a UDP data tunnel, as described above. Connection with ingress system 110 by client ingress module 155 may serve to establish a client data tunnel 202 comprising intraclient data connection 200 and client ingress data connection 201 between local client data transfer application 156 and ingress system 110 via the ingress module 155.

Client ingress module 155 may identify a remote ingress system 110 via information provided by mapping service 310. In operation, multiple ingress systems 110 may be available for connection with local client system 150. Identifying one from among the multiple ingress systems 110 to connect to may be facilitated by mapping service 310.

Client ingress module 155 may communicate a destination domain name, i.e., a domain name for a server or system with which a data connection is intended, to mapping service 310. Client ingress module 155 may request a mapped domain name from mapping service 310. Client ingress module 155 may receive a mapped domain name from mapping service 310 in response to the request. Client ingress module 155 may resolve the mapped domain name using standard domain name resolution services and use the resulting resolved IP address to identify ingress system 110 and establish the client ingress data connection 201. Client ingress module 155 may store the mapped domain name for later use. Thus, for establishing future connections with the destination domain, client ingress module 155 may immediately use the mapped domain name to identify and connect with ingress system 110 without requesting a new mapped domain name from the mapping service 310.

In some implementations, client ingress module 155 may receive a mapped domain name indirectly. Mapping service 310 may be requested to provide a mapped domain name for a client system 150 by a third party. The third party may then provide the mapped domain name to the client system 150 for future use. For example, a third party may operate a remote system 250, and may wish to provide a client system 150 with secure, accelerated access via systems and methods disclosed herein. The operator of remote system 250 may communicate with mapping service 310 to determine a mapped domain name that client system 150 may use to identify and connect to an ingress system 110. The operator of remote system 250 may then supply client system 150 with the mapped domain name for future connections between client system 150 and remote system 250.

A mapped domain name provided to a client system 150 may be used to identify a closest ingress system 110. A closest ingress system 110 may refer to an ingress system 110 having a shortest, i.e., requiring a least amount of time for data transfer, network pathway between client system 150 and ingress system 110. As discussed above, reducing the length of a network pathway to the ingress system 110 may increase the proportionate amount of the network pathway traveled over data transfer tunnels established by a proprietary data transfer protocol.

Local client data transfer application 156 may establish a cryptographically secure connection 208 between ingress system 110 and local client data transfer application 156, via the client data tunnel 202. In some implementations, the cryptographically secure connection 208 may include a transport layer security (TLS) connection. In alternative implementations, the cryptographically secure connection may be based on other cryptographic protocols, including public and private keys maintained by client system 150 and/or ingress system and/or digital certificate.

As discussed above, cryptographically secure connection 208 may include a TLS connection established over data tunnel 202, by local client data transfer application 156. The establishment of a TLS connection between local client data transfer application 156 and ingress system 110 may permit secure communications over data tunnel 202. Because the cryptographic basis of the TLS connection is negotiated at the beginning of each data transfer session, it is not necessary for client system 150 and ingress system 110 to store encryption information, via private and public keys, for example. Thus, local client data transfer application 156 may be able to establish a secure data tunnel through which to transfer data to ingress system 110.

In some implementations, local client data transfer application 156 may establish a client ingress data connection 201 directly with ingress system 110, without the requirement of client ingress module 155. In such implementations, client ingress data connection 201 may be a connection established between local client data transfer application 156 and system 110 using any suitable standard protocol or proprietary protocol. Subsequent to establishment of client ingress data connection 201, local client data transfer application 156 may negotiate and establish a TLS connection with ingress system 110 across the client ingress data connection 201.

Local client data transfer application 156 may contact mapping service 310 directly to supply a destination domain name and request a mapped domain name. Contacting mapping service 310 may be accomplished through user action, e.g., pointing a web browser to the mapping service 310, and or automatically, e.g., by an extension or plug-in operating on top of local client data transfer application 156.

Local client data transfer application 156 may also receive a mapped domain name indirectly, as described above with respect to client ingress module 155. That is, a third party may receive a mapped domain name from mapping service 310 and provide that mapped domain name either to local client data transfer application 156 and/or to a user of local client data transfer application 156. For example, a third party operator of remote system 250 may supply a specific URL to a user of local client data transfer application 156 for establishing connections with remote system 250.

Local client data transfer application 156 may exchange data with remote system 250. Remote system 250 may include, for example, a server, such as an FTP server and/or an HTTP server. Local client data transfer application 156 may exchange data with remote system 250 across the data tunnel 260, comprising intraclient data connection 200, client ingress data connection 201, data connection 203, and data connection 205. Data tunnel 260 may be established by ingress system 110 and egress system 210 working in cooperation, as discussed in greater detail below.

Ingress system 110 may be a cloud based system operating to facilitate the creation of data transfer tunnels to remote egress systems 210 to facilitate data transfer between a local system associated with the ingress system 110 and a remote system associated with the egress system 210. Multiple ingress systems 110 may be in operation at any one time.

Ingress system 110 may be a cloud based system comprising multiple computing platforms cooperating to execute software implementing the ingress system 110. Ingress system 110 may also be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to receive a data connection from a client system 150 and establish a data tunnel with an egress system 210.

Ingress system 110 may include one or more processors 112 (also interchangeably referred to herein as processors 112, processor(s) 112, or processor 112 for convenience), one or more storage devices 114, and/or other components. Processors 112 may be programmed by one or more computer program instructions. For example, processors 112 may be programmed by ingress module 115, egress module 116 and/or other instructions that program ingress system 110 to perform various operations, each of which are described in greater detail herein. As used herein, for convenience, the various instructions will be described as performing an operation, when, in fact, the various instructions program the processors 112 (and therefore ingress system 110) to perform the operation.

Operating as a cloud based system, the one or more processors 112 of ingress system 110 may be included in a plurality of server platforms and may cooperate to perform the functions that implement and/or instantiate ingress system 110. Similarly, the one or more storage devices 114 of ingress system 110 may be distributed across multiple physical platforms, and cooperate to provide the required storage space. Ingress system 110 may therefore operate as a virtualized system.

Ingress system 110 may include an ingress module 115. Ingress module 115 may be a software module operating on ingress system 115 to perform various functions. Ingress module 115 of ingress system 110 may perform the necessary operations, described below, to establish and maintain data transfer connections with local system 150 and egress system 210.

Ingress module 115 may facilitate a data connection between client system 150 and remote system 250, via egress system 210. More specifically, ingress module 115 may establish a first data connection with client system 150 and a second data connection with egress system 210. Together, these first and second data connections may operate as a data tunnel for data transfer between client system 150 and egress system 210.

Ingress module 115 may access tunnel routing service 350 to facilitate selection of egress system 210. In operation, multiple egress systems 210 may be available to ingress module 115. An optimal egress system 210 may be selected by ingress module 115 based on data obtained from tunnel routing service 350 and/or may be selected by tunnel routing service 350 based on data transmitted to tunnel routing service 350 from ingress module 115. An optimal egress system 210 may be determined to provide optimal data throughput for system 100. Egress system 210 may be selected based on physical proximity to remote system 250. Egress system 210 may be selected based on a maximum level of bandwidth achievable between ingress system 110 and egress system 210. Egress system 210 may be selected based on a minimum amount of latency for transmissions between ingress system 110 and egress system 210. Egress system 210 may be selected based on a minimum amount of packet and/or data loss between ingress system 110 and egress system 210. Egress system 210 may further be selected based on any suitable metric. Further details on the selection of egress system 210 may be understood with respect to the description of tunnel routing service 350, described below.

Ingress module 115 may establish a data transfer connection 203 with an egress module 216 of egress system 210. Data transfer connection 203 may be established via any standard protocol, including, without limitation, TCP, HTTP, UDP, and others. Data transfer connection 203 may be established by any proprietary protocol, including, for example, a PTP as described herein. In some implementations, data transfer connection 203 may include a PTP connection employing a UDP data tunnel, as described above.

Ingress module 115 may negotiate a secure data transfer connection 204 to remote system 250. Secure data transfer connection 204 may be negotiated across data transfer connection 203 established between ingress system 110 and egress system 210 and data transfer connection 205 established between egress system 210 and remote system 250. The establishment of data transfer connection 205 is discussed in greater detail below with respect to egress system 210. As discussed above, data transfer connection 203 may include a connection established via a transport layer protocol, such as TCP and/or UDP, and other protocols including HTTP and proprietary protocols such as PTP. Secure data transfer connection 204 may include a cryptographically secure connection between ingress system 110 and remote system 250, stretching across data transfer connection 203 and data transfer connection 205. Secure data transfer connection 204 may include a TLS encrypted connection.

Ingress module 115 may initiate a secure data transfer connection 204 with remote system 250 by, for example, contacting a TLS server port of remote system 250 and requesting a secure connection. Ingress module 115 and remote system 250 may then establish secure data transfer connection 204 via a TLS handshake procedure. Ingress module 115 and remote system 250 may authenticate each other via use of public key authentication methods. Ingress module 115 and remote system 250 may communicate to select a mutually supported cipher protocol and generate session keys usable for the current session. Secure data transfer connection 204 may thus be cryptographically secured.

Alternative methods of generating a secure data connection between ingress module 115 and remote system 250 for the establishment of secure data transfer connection 204 may be selected as appropriate.

In some implementations, ingress system 110 may further include an egress module 116. Egress module 116 may be configured to provide an egress point for the establishment of a data tunnel. As illustrated in FIG. 1, ingress system 110 may include both an ingress module 115 and an egress module 116. This configuration may permit ingress system 110 to operate as an egress system for incoming data transfer requests in addition to its functionality as an ingress system. Operation of egress module 116 may be similar to that of egress module 216, described in greater detail below.

In some implementations, an optimal egress server returned by tunnel routing server 350 corresponds to egress module 116 operating on ingress system 110. That is, ingress system 110 may act as both ingress server and egress server for the same data request.

In some implementations, any or all of the operations of ingress system 110 may be performed by client ingress module 155. That is, client ingress module 155, operating on client system 150, may perform any or all of the above operations of ingress system 110 to establish a connection with an egress system 210, including, but not limited to, communicating with tunnel routing service 350 and establishing a data transfer connections 203, 204 with egress system 210. In some implementations, client egress module 155 and ingress system 110 may cooperate to perform any or all of the operations discussed above with respect to ingress system 110.

In an exemplary implementation, client ingress module 155 may perform all of the operations of ingress system 110 discussed above, with the exception of establishing data transfer connection 203 and secure data transfer connection 204. Secure data transfer connection 204 may be a TLS secured connection using public key authentication methods. Ingress system 110 may perform the operations to establish the TLS connection with remote system 250. Thus, it may not be required for client system 150 to securely store the keys required to authenticate a TLS connection.

Egress System 210

Egress system 210 may be a cloud based system operating to facilitate the creation of data transfer tunnels with ingress systems 110 to facilitate data transfer between a local system associated with the ingress system 110 and a remote system associated with the egress system 210. Multiple egress systems 210 may be in operation at any one time.

Egress system 210 may be a cloud based system comprising multiple computing platforms cooperating to execute software implementing the egress system 210. Egress System 210 may also be configured as a server device, a gaming console, a handheld gaming device, a personal computer (e.g., a desktop computer, a laptop computer, etc.), a smartphone, a tablet computing device, and/or other device that can be programmed to initiate data connections.

Egress System 210 may include one or more processors 212 (also interchangeably referred to herein as processors 212, processor(s) 212, or processor 212 for convenience), one or more storage devices 144, and/or other components. Processors 212 may be programmed by one or more computer program instructions. For example, processors 212 may be programmed by ingress module 215, egress module 216 and/or other instructions that program egress system 210 to perform various operations, each of which are described in greater detail herein. As used herein, for convenience, the various instructions will be described as performing an operation, when, in fact, the various instructions program the processors 212 (and therefore Egress System 210) to perform the operation.

Operating as a cloud based system, the one or more processors 212 of egress system 210 may be included in a plurality of server platforms and may cooperate to perform the functions that implement and/or instantiate egress system 210. Similarly, the one or more storage devices 214 of egress system 210 may be distributed across multiple physical platforms, and cooperate to provide the required storage space. Egress system 210 may therefore operate as a virtualized system.

Egress system 210 may include an egress module 215. Egress module 215 may be a software module operating on egress system 210 to perform various functions. Egress module 215 of egress system 210 may perform the necessary operations, described below, to establish and maintain data transfer connections with remote system 250 and ingress system 110.

Egress module 216 may be configured to resolve a domain name of remote system 250 and connect to the remote system 250. Ingress module 115 may communicate a destination domain name to egress module 216 over data connection 203 after it is established. Egress module 216 may receive a destination domain name communicated from ingress module 115. Egress module 216 may resolve the destination domain name to identify remote system 250, to which client system 150 seeks to connect with.

Egress system 210 may initiate a connection with remote system 250. After identifying the remote system 250 via the resolved destination domain name, remote system 250 may establish a data transfer connection 205 with remote system. Data transfer connection 205 may be established with any suitable protocol, including TCP, HTTP, FTP, UDP, and others. In an exemplary embodiment, data transfer connection 205 may be established via TCP.

The establishment of data transfer connection 205 may complete the transport layer connection between local client data transfer application 156 and remote system 250, via intraclient data connection 200, client ingress data connection 201, data transfer connection 203, and data transfer connection 205. Secure data transfer connection 204 may be established between ingress system 110 and remote system 250 via data transfer connection 203, egress system 210, and data transfer connection 205. Cryptographically secure connection 208 may be established between local client data transfer application 156 and ingress system 110. Thus, the multiple transport layer connections 200, 201, 203, 205 and their associated secure data transfer connections 208, 204, may establish a data tunnel 260 between local client data transfer application 156 and remote system 250.

In some implementations, egress system 210 may further include an ingress module 215. Ingress module 215 may be configured to provide an ingress point for the establishment of a data tunnel. As illustrated in FIG. 1, egress system 210 may include both an ingress module 215 and an egress module 216. This configuration may permit egress system 210 to operate as an ingress system for incoming data transfer requests in addition to its functionality as an egress system. Operation of ingress module 215 may be similar to that of ingress module 216, described above. Similar to ingress system 110, as discussed above, egress system 210 may operate as both ingress and egress point for a single data connection in some implementations.

Remote System 250

Remote system 250 may be a local client computing device performing operations for a user. Remote system 250 may perform data transfer operations with client system 150.

Remote System 250 may be configured as a server device, a gaming console, a handheld gaming device, a personal computer (e.g., a desktop computer, a laptop computer, etc.), a smartphone, a tablet computing device, and/or other device that can be programmed to exchange data. In some implementations, remote system 250 may also operate as a cloud based computing system.

Remote System 250 may include one or more processors 252 (also interchangeably referred to herein as processors 252, processor(s) 152, or processor 152 for convenience), one or more storage devices 254, and/or other components. Processors 252 may be programmed by one or more computer program instructions. As used herein, for convenience, the various instructions will be described as performing an operation, when, in fact, the various instructions program the processors 252 (and therefore Remote System 250) to perform the operation.

Operating as a cloud based system, the one or more processors 112 of remote system 250 may be included in a plurality of server platforms and may cooperate to perform the functions that implement and/or instantiate remote system 250. Similarly, the one or more storage devices 254 of remote system 250 may be distributed across multiple physical platforms, and cooperate to provide the required storage space. Remote system 250 may therefore operate as a virtualized system.

Remote system 250 may include or operate as a data server, for example, an HTTP(S) and/or FTP(S) server. Remote system 250 may exchange data with local client data transfer application 156 over the established data tunnel 260. Local client data transfer application 156 of client system 150 may use, for example, an HTTP(s) protocol to transfer data to and from remote system 250. In some implementation, HTTP(S) protocols may be used to encapsulate data transferred between local client data transfer application 156 and remote system 250. Thus, the connection established through data tunnel 260 may be used to transfer any type of data, regardless of whether it contains traditional HTTP content.

In some implementations, local client data transfer application 156 and remote system 250 may exchange HTTP PDUs as follows. Local client data transfer application 156 may transmit HTTP PDUs to client ingress module 155 via data connection 200. Client ingress module 155 may employ a PTP protocol using a UDP tunnel to transmit the HTTP PDUs as payload data of the PTP PDUs carried by the UDP tunnel of client egress data connection 201. Ingress module 115 of ingress system 110 may then forward the UDP PDUs received via client egress data connection 201 to egress module 216 via data transfer connection 203. Egress module 216 may then unwrap the UDP and PTP layers of the UDP PDUs received via the data transfer connection 203 to retrieve the HTTP PDUs sent by local client data transfer application 156. Egress module 216 may then employ data transfer connection 205 using TCP to forward the HTTP PDUs to remote system 250. Remote system 250 may respond to the HTTP requests from local client data transfer application 156 via the reverse of the above pathway.

In some implementations, local client data transfer application 156 may transfer HTTP PDUs directly to ingress module 115 via a TLS secured TCP connection. Ingress module 115 may then forward the received HTTP PDUs to egress module 216 via a PTP employing a UDP tunnel as data transfer connection 203.

Mapping Service 310

Mapping service 310 may be a cloud based domain name mapping service. Mapped domain names provided by mapping service 310 may identify the addresses of ingress systems 110. Mapping service 310 may also be configured as a server device, a gaming console, a handheld gaming device, a personal computer (e.g., a desktop computer, a laptop computer, etc.), a smartphone, a tablet computing device, and/or other device that can be programmed to provide domain name mapping.

Mapping service 310 may provide mapped domain names for use in system 100. Client system 150 may establish a connection with mapping service 310 to obtain a mapped domain name. Client system 150 may communicate to mapping service 310 a destination domain name, i.e., a domain name of a remote system 250 that is intended for connection. A destination domain name may be selected and/or input by a user of client system 150 and/or may be selected or determined automatically within client system 150. The connection between client system 150 and mapping service 310 may be established via local client data transfer application 156 and/or by client ingress module 155. Mapping service 310 may receive the destination domain name from client system 150 and provide a mapped domain name.

The mapped domain name may be provided to direct communications from client system 150 to ingress system 110. Resolving the mapped domain name via standard DNS look-up procedures may provide an IP address directing local client data transfer application 156 and/or client ingress module 155 to ingress system 110.

Tunnel Routing Service 350

Tunnel routing service 350 may be a cloud based service operating to identify egress systems 110 suited for creating connections with remote systems 250.

Tunnel routing service 350 may also be configured as a server device, a gaming console, a handheld gaming device, a personal computer (e.g., a desktop computer, a laptop computer, etc.), a smartphone, a tablet computing device, and/or other device that can be programmed to initiate data connections.

Tunnel routing service 350 may be configured to communicate with ingress system 110. Tunnel routing service 350 may receive an egress system request from ingress system 110 and provide, in response to the request, a selected egress system 210. The request from ingress system 110 may include one or more of the mapped domain name and the destination domain name.

In response to the request, tunnel routing service 350 may select an egress system 210 for ingress system 110 to connect with. The determined egress system 210 may be selected by tunnel routing service 350 based on a predicted measure of data throughput for system 100. Egress system 210 may be selected based on physical proximity to remote system 250. Egress system 210 may be selected based on a maximum level of bandwidth achievable between ingress system 110 and egress system 210. Egress system 210 may be selected based on a minimum amount of latency for transmissions between ingress system 110 and egress system 210. Egress system 210 may be selected based on a minimum amount of packet and/or data loss between ingress system 110 and egress system 210. Egress system 210 may further be selected based on any suitable metric. In some implementations, ingress system 110 may communicate to tunnel routing service 350 a set of preferred metrics, criteria, and/or parameters for selection of egress system 210.

Tunnel routing service 350 may maintain a relational database of optimal egress systems 210 associated with various destination domains. For example, tunnel routing service may maintain a list of all domain names requested by various client systems and a corresponding list of optimal egress servers for each domain name in the list. In some implementations, multiple egress servers may be stored for each domain name, where the different egress servers are selected to optimize different data transfer parameters.

In some implementations, tunnel routing service 350 may communicate with mapping service 310. When a client system 150 communicates a destination domain to mapping service 310 as a request for a mapped domain name, mapping service 310 may communicate the destination domain name to tunnel routing service. If the requested destination domain name does not have an entry in the database of tunnel routing service 350, tunnel routing service 350 may then initiate an active search to determine an optimal egress server for the requested destination domain name. Later, when the client system 150 has established a connection with an ingress service and requests information from the tunnel routing service 350 for an egress server associated with the domain name, tunnel routing service 350 may be prepared to provide the information.

In another implementation, in response to the request, tunnel routing service 350 may provide ingress system 110 with information for the selection of egress system 210. In such an implementation, ingress system 110 may store a set of criteria and/or parameters for selecting an egress system 210 and/or may receive a set of criteria and/or parameters for selecting an egress system 210 from client system 150 at the time client egress data connection 201 is established. Parameters for selecting an egress system 210 may include transfer speed, total time of data transfer and other suitable selection parameters. For example, ingress system 110 may request, from tunnel routing service 350, a list of potential egress systems 210 and information associated with each. Ingress system 110 may then select a suitable egress system 210.

Figure 2:
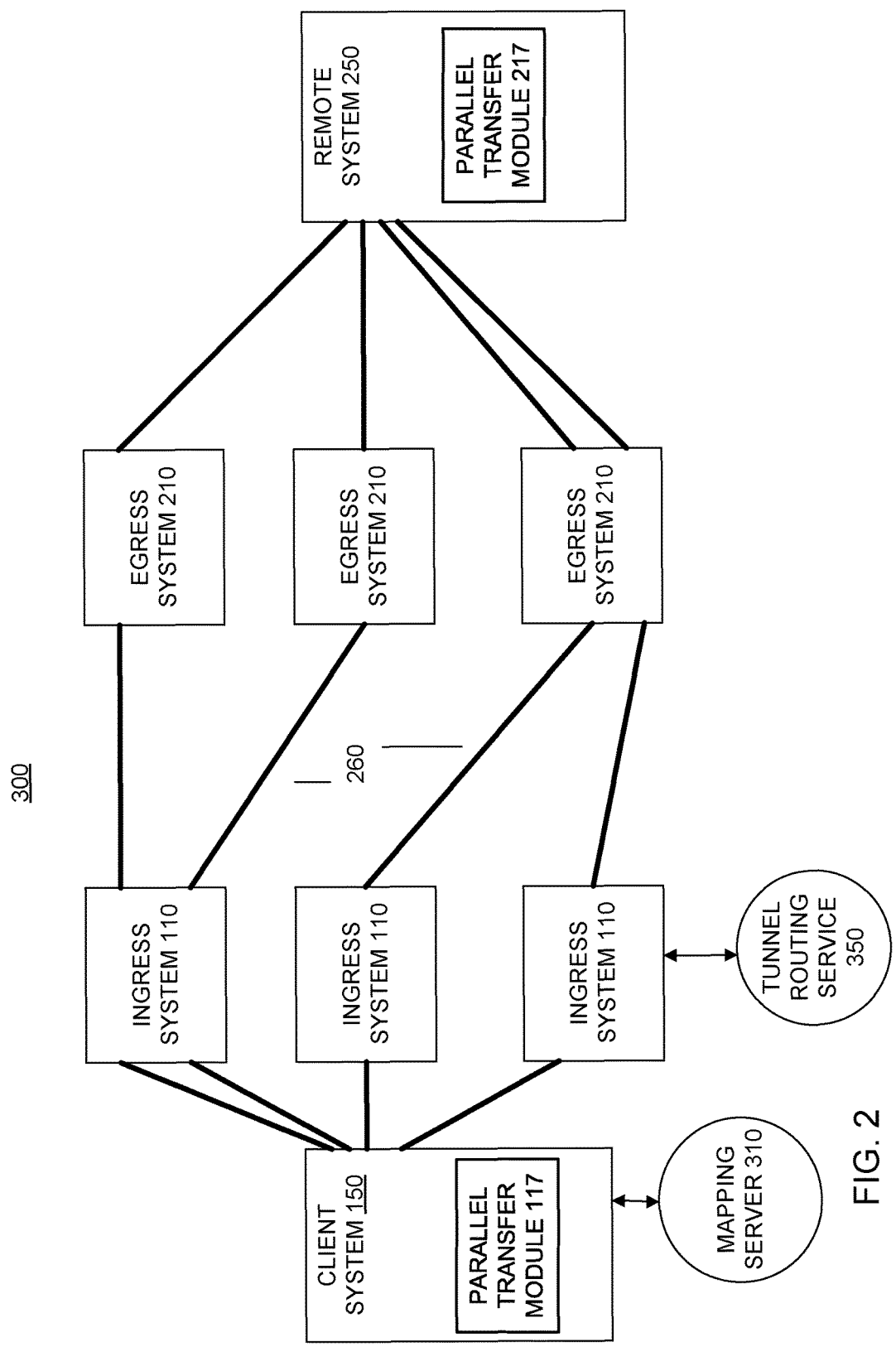
FIG. 2 illustrates a system for providing parallel data transfer pathways, according to an implementation of the invention.

FIG. 2 illustrates a system 300 for providing secure high-speed access to remote system 250 along parallel HTTP paths. In one implementation, system 300 may include one or more ingress systems 110, one or more egress systems 210, a client system 150, a remote system 250, a mapping service 310, a tunnel routing service 350, and/or other components. These components may perform similar functions as those of system 100, described with respect to FIG. 1.

Additionally, client system 150 and remote system 250 may cooperate to establish a plurality of data tunnels 260. Client system 150 may include a parallel transfer module 117 and remote system 250 may include a parallel transfer module 217. As illustrated in FIG. 2, data tunnel 260 may include a plurality of parallel data tunnels 260. The plurality of parallel data tunnels 260 may be facilitated by parallel transfer modules 117 and 217.

Parallel transfer modules 117 and 217 may be software modules operating or executing on client system 150 and remote system 250 respectively. Parallel transfer modules 117 and 217 may operate to facilitate data transfer across multiple data transfer connections, as explained below.

Parallel data tunnels 260 may each provide a secure data transfer connection between client system 150 and remote system 250. Parallel data tunnels 260 may be established by scaling out the connection between client system 150 and remote system 250 to include additional computing devices. As described above, ingress system 110 and egress system 210 may each comprise cloud based resources, and the components of these systems may be executed by cloud accessible servers.

In a scaling out operation, parallel transfer module 117 may recruit additional ingress systems 110 to establish multiple parallel data transfer connections 260 with additional egress systems 210. Multiple ingress systems 110 may operate on different physical hardware and may operate on the same physical hardware. For example, multiple ingress systems 110 may be established across multiple computing platforms. In some implementations, a single computing platform, for example, a multi-core CPU and/or a multi-cpu machine, may establish multiple ingress systems 110. Parallel transfer module 117 may receive data incoming from local client data transfer application 156 and divide the data packets between the multiple parallel data transfer connections 260. Data packets may be routed to through the data transfer connections 260 based on a capacity of each connection. For example, where one data transfer connection 260 is able to consistently maintain a higher throughput, more data may be routed via that data transfer connection. In this fashion, efficient use of all established parallel data transfer connections 260 may be achieved.

Parallel transfer module 217 of remote system 250 may receive data from multiple data transfer connections 260 and combine the multiple data streams into a single data stream. A single data stream may include one or more individual computer files. In some implementations, multiple data streams may each carry individual computer files. In some implementations, multiple data streams may each carry portions of a single computer file. In implementations in which remote system 250 expects an ordered packet stream, e.g., via a TCP connection, parallel transfer module 217 may function to reassemble data packets received via parallel data transfer connections 260 in an appropriate order for remote system 250.

In some implementations, client system 150 and remote system 250 may use multiple data transfer connections 260 to transfer multiple separate data streams. It is not required for parallel transfer modules 117 and 217 to break single data streams into multiple data streams and re-combine them. Client system 150 may originate and/or request multiple data streams and remote system 250 may also originate and/or request multiple data streams.

Parallel transfer module 117 and parallel transfer module 217 may each perform all of the functions of each other as described above. For example, if a client system 150 requests a significant amount of data from remote system 250, the data transfer from remote system 250 to client system 150 may require multiple parallel data connections 260. Parallel transfer module 217 may function to recruit additional outgoing ingress servers. Similarly, data disassembly and reassembly tasks may be performed by either parallel transfer module 117, 217, depending on the flow of data.

Each of parallel data transfer connections 260 may be established via the methods discussed above with respect to FIG. 1. Each of parallel data transfer connections 260 may be secured via a cryptographically secured data transfer connection established between client system 150 and remote system 250. Once established, multiple parallel data transfer connections 260 may appear as a single data transfer connection to applications operating on client system 150 and remote system 250.

The use of parallel data transfer connections 260 may permit system 100 to provide increased throughput as well as greater reliability for data transfer. During data transfer, the recruitment of several servers by ingress system 110 and egress system 210 may permit an increase in throughput without a requirement to find a single server capable of increased throughput.

Although illustrated in FIGS. 1 and 2 as individual components, ingress system 110, egress system 210, client system 150, and remote system 250 may each include a plurality of individual components (e.g., computer devices) each programmed with at least some of the functions described herein. In this manner, some components of ingress system 110 and/or client system 150 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112, 152, 212, 252 are programmed to perform the functions described herein.

Furthermore, it should be appreciated that although the various instructions are illustrated in FIGS. 1 and 2 as being co-located within a single processing unit, in implementations in which processor(s) 112, 152, 212, 252 include multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112, 152, 212, 252 may be programmed by one or more additional instructions that may perform some or all of the functionality attributed herein to one of the instructions.

The various instructions described herein may be stored in storage devices 114, 154, 214, 254, which may comprise random access memory (RAM), read only memory (ROM), and/or other memory. The storage device may store the computer program instructions (e.g., the aforementioned instructions) to be executed by processor 112, 152, 212, 252 as well as data that may be manipulated by processor 112, 152, 212, 252. The storage device may comprise floppy disks, hard disks, optical disks, tapes, or other storage media for storing computer-executable instructions and/or data.

The various components illustrated in FIGS. 1 and 2 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

Figure 3:
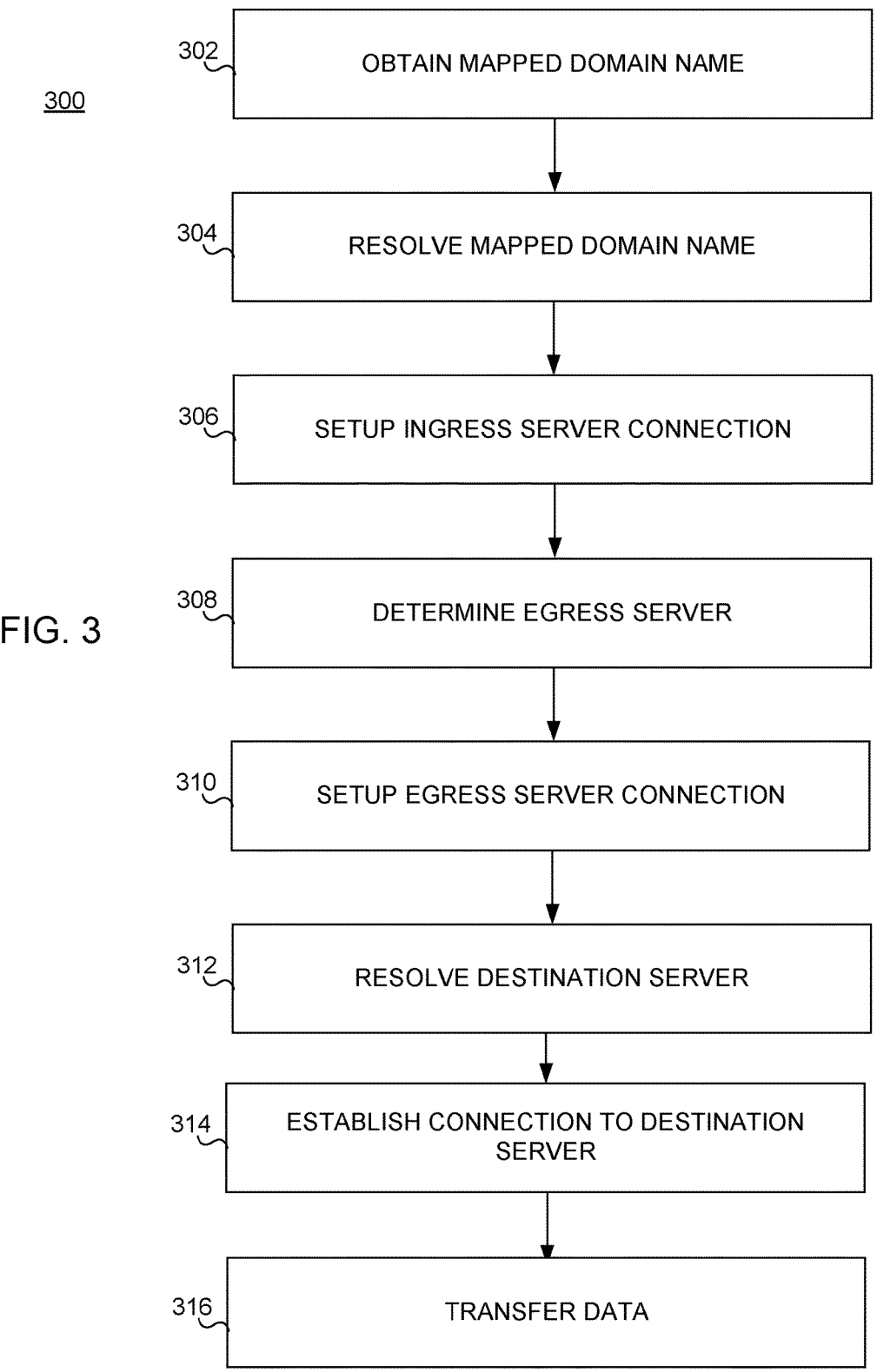
FIG. 3 illustrates a process for providing data transfer, according to an implementation of the invention.

FIG. 3 depicts a process 300 of establishing and transferring data over a data tunnel, according to an implementation of the invention. Process 300 may perform operations to establish data tunnel 260 through functions performed by components of client system 150, mapping service 310, tunnel routing service 350, ingress system 110, egress system 210, and remote system 250. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, process 300 may include obtaining a mapped domain name. Mapping service 310 may provide a mapped domain name in response to a request including a destination domain name. The request for the mapped domain name may originate from client system 150. The request may originate from client ingress module 155 and/or from local client data transfer application 156. The mapped domain name returned in response to a request including a destination domain name may be resolvable to an IP address of an ingress server. In some implementations, the mapped domain may contain information specifying the destination domain name. Thus, mapping service 310 may function to direct a local system to an ingress server.

In an operation 304, process 300 may include resolving the mapped domain name. Client system 150 may resolve the mapped domain name to determine an IP address for establishing an ingress connection. Domain name resolution may be performed by a connection made between client ingress module 155 and/or local client data transfer application 156 and a public or private DNS server.

In an operation 306, process 300 may include establishing an ingress server connection. In some implementations, local client data transfer application 156 may use the IP address resolved from the mapped domain name to identify, contact, and establish a data transfer connection with ingress system 110. Local client data transfer application 156 may establish client ingress data connection 201 with ingress system 110 via any suitable data transport protocol, including, for example, UDP, TCP, HTTP, etc., as well as proprietary data protocols.

In some implementations, establishing an ingress server connection may include an operation of establishing an intraclient data connection 200 between local client data transfer application 156 and client ingress module 155. Intraclient data connection 200 may be established via any suitable data transport protocol, including, but not limited to, UDP, TCP, HTTP, etc. In such an implementation, client ingress data connection 201 may then be established by client ingress module 155 and ingress system 110. Client ingress module may establish client ingress data connection 201 using any suitable data transport protocol, including, but not limited to, UDP, TCP, HTTP, etc., as well as proprietary data transfer protocols.

Once established, the data connection between local client data transfer application 156 and ingress system 110 may be referred to as client data tunnel 200. Thus, client data tunnel 200 may include one or more of ingress data connection 201 and intraclient data connection 200.

In some implementations, establishing an ingress server connection may further include securing client data tunnel 200 via a cryptographically secure method. For example, local client data transfer application 156 and ingress system 110 may negotiate and establish a TLS connection between one another. Other secure application layer protocols may be implemented to provide security to client data tunnel 200.

In an operation 308, process 300 may include determining an egress server. Ingress module 115 of ingress system 110 may contact tunnel routing service 350 to facilitate determination of an egress server. Ingress module 115 may provide to tunnel routing service 350 the destination domain name initially requested by client system 150. In response to the request from ingress module 115, tunnel routing service 350 may provide ingress module 115 with an identity, address, or other information specifying an egress system 210 appropriate for establishing a data tunnel for connection with a computer system associated with the destination domain name. As discussed above, tunnel routing service 350 may determine an egress system 210 based on various factors, including transfer speeds, latency times, total data throughput, connection reliability, and others. In some implementations, tunnel routing service 350 may provide, in response to the request, information which ingress module 115 may use to determine an egress system 210.

In an operation 310, process 300 may include establishing an egress server connection. Ingress module 115 may communicate with egress module 216 of egress system 210, identified by information provided by tunnel routing service 350, to establish a data transfer connection 203 between ingress system 110 and egress system 210. Data transfer connection 203 may be established using any suitable protocol, including, but not limited to, UDP, TCP, HTTP, etc. as well as proprietary protocols. In some implementations, data transfer connection 203 may include proprietary data units transferred over a UDP tunnel. In some implementations, the UDP tunnel may be TLS secured.

In some implementations, establishing an egress server connection may include establishing multiple data connections 203 between multiple servers recruited to function as part of ingress system 110 with multiple servers recruited to function as part of egress system 210.

In an operation 312, process 300 may include resolving a destination server. Egress system 210 may use information communicated from ingress system 110 to identify a destination server. Such information may include the destination domain name provided by client system 150. Egress system 210 may use the destination domain name to resolve an IP address of a remote system 250 with which client system 150 wishes to exchange data.

In an operation 314, process 300 may include establishing a connection with a destination server or another type of remote system 250. Egress system 210 may use the IP address information from the destination domain name resolution to identify and establish data transfer connection 205 with remote system 250. Egress system 210 may establish a connection with remote system 250 using any suitable data transfer protocol, including, but not limited to, TCP, UDP, HTTP, etc.

Establishing a connection with a destination server may include establishing a secure data transfer connection 204 between ingress server 110 and remote system 250 across data transfer connection 203 and data transfer connection 205. Secure data transfer connection 204 may be established via the TLS protocol and/or by other standard security protocols. After establishment of secure data transfer connection 204, a secure data tunnel 260 may exist from local client data transfer application 156, through ingress system 110 and egress system 210, and on to remote system 250.

In an operation 316, process 300 may include transferring data between a local system, e.g., client system 150, and a destination system, e.g., remote system 250 through secure data tunnel 260. Data may be transferred across data tunnel 260 via HTTP(s) and/or by other suitable data transfer protocols. In some implementations, HTTP PDUs may be exchanged between client system 150 and remote system 250 via a data tunnel 260 operating under a PTP.

In some implementations, transferring data between client system 150 and remote system 250 may include transferring data across multiple parallel data transfer connections 203 between ingress system 110 and egress system 210. Parallel transfer modules 117 ingress system 110 and may divide a data stream received from local client data transfer application 156 for transport over the multiple parallel data transfer connections 203 for reception and reassembly by parallel transfer module 217 of egress system 210 before transfer to remote system 250. This pathway may be reversed for data transferred from remote system 250 to client system 150.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A computer implemented method of establishing a data transfer connection between a client system and a remote system, the method being implemented in a cloud-based computer system using a plurality of processors programmed with computer program instructions that, when executed by the one or more physical processors implement an ingress system, a tunnel routing service, and an egress system, the method comprising:
   receiving, by the ingress system, a request to establish a first data transfer connection with the client system;
   establishing, by the ingress system, the first data transfer connection with the client system;
   receiving, by the ingress system, a destination domain name corresponding to the remote system;
   supplying, by the ingress system, the destination domain name to the tunnel routing service and requesting information about an address of the egress system corresponding to the destination domain name;
   receiving, by the ingress system, the information about the address of the egress system corresponding to the destination domain name from the tunnel routing service;
   establishing, by the ingress system, a second data transfer connection with the egress system based on the address of the egress system received from the tunnel routing service;

establishing, by the egress system, a third data transfer connection between the remote system and the egress system;

facilitating, by the ingress system and the egress system, data exchange between the client system and the remote system via a data tunnel comprising the first data transfer connection, the second data transfer connection, and the third data transfer connection.

2. The computer implemented method of claim 1, wherein establishing the first data transfer connection includes establishing a transport layer security data connection.

3. The computer implemented method of claim 1, further comprising establishing a transport layer security data connection between the ingress system and the remote system across the second data transfer connection and the third data transfer connection.

4. The computer implemented method of claim 1, further comprising selecting, by the tunnel routing service, the egress system to correspond to the mapped domain name.

5. The computer implemented method of claim 4, wherein selecting the egress system to correspond to the mapped domain name includes determining the egress system based on at least one of data transfer rates, overall data throughput, and latency times.

6. The computer implemented method of claim 1, wherein the cloud-based computer system is further programmed with instructions that implement a second ingress system and a second egress system; and the method further comprises:
establishing, by the second ingress system and the second egress system, a second data tunnel between the client system and the remote system via the second ingress system and the second egress system.

7. The computer implemented method of claim 1, further comprising establishing, by the ingress system, one or more fourth data transfer connections between the egress system and the ingress system in response to an increased traffic load.

8. The computer implemented method of claim 1, wherein the plurality of processors are further programmed to establish a mapping service, and the method further comprises:
receiving, by the mapping service, a request to provide a mapped domain name corresponding to the ingress system, the request including a destination domain name corresponding to the remote system;
providing, by the mapping service, the mapped domain name responsive to the request.

9. The computer implemented method of claim 8, further comprising determining the mapped domain name corresponding to the ingress system and the client system, based on at least one of data transfer rates, overall data throughput, and latency times between the client system and the ingress system.

10. A system for establishing a secure data transfer connection between a client system and a remote system, the system comprising:
a cloud-based computer system comprising one or more physical processors programmed by computer program instructions that when executed, cause the computer system to implement:
an ingress system configured to:
receive a request to establish a first data transfer connection with the client system and establish a second data transfer connection with the client system,
receive a request to establish a second data transfer connection between the client system and the remote system corresponding to a destination domain name;
an egress system; and
a tunnel routing service configured to receive a request for information from the ingress system about an address of the egress system corresponding to the destination domain name, and transmit information about the address of the egress system corresponding to the destination domain name to the ingress system;
wherein the ingress system is further configured to establish a second data transfer connection with the egress system based on the address of the egress system received from the tunnel routing service,
the egress system is further configured to establish a third data transfer connection with the remote system, and
the ingress system and the egress system are configured to facilitate data exchange between the client system and the remote system via a data tunnel comprising the first data transfer connection, the second data transfer connection, and the third data transfer connection.

11. The system of claim 10, wherein the ingress system is further configured to establish the first data transfer connection as a cryptographically secure TSL data connection.

12. The system of claim 10, wherein the egress system is further configured to establish the third data transfer connection includes as a cryptographically secure TSL data connection.

13. The system of claim 10, wherein the tunnel routing service is further configured to selecting the egress system to correspond to the mapped domain name.

14. The system of claim 13, wherein the tunnel routing service is further configured to select the egress system to correspond to the mapped domain name by determining the egress system based on at least one of data transfer rates, overall data throughput, and latency times.

15. The system of claim 10, wherein
the cloud-based computer system is further programmed to implement a second ingress system and a second egress system;
the second ingress system and the second egress system are configured to establish a second data tunnel between the client system and the remote system via the second ingress system and the second egress system.

16. The system of claim 10, wherein the ingress system is further configured to establish one or more fourth data transfer connections between the egress system and the ingress system in response to an increased traffic load.

17. The system of claim 10, wherein the physical processors are further programmed by computer program instructions to implement
a mapping service programmed to:
receive requests from the client system to provide a mapped domain name, the request including a destination domain name corresponding to a remote system, and
provide the mapped domain name in response to the request.

18. The system of claim 17, wherein the mapping service is further programmed to: determine the mapped domain name corresponding to the ingress system and the local client, based on at least one of data transfer rates, overall data throughput, and latency times between the local client and the ingress system.

* * * * *